United States Patent [19]
Walters

[11] 3,826,368
[45] July 30, 1974

[54] LIQUID FILTER SYSTEM HAVING AUTOMATIC FILTER BACK WASH CONTROL AND METHOD OF OPERATION

[75] Inventor: Theodore M. Walters, Milford, N.J.

[73] Assignee: Charles H. Brown, Boca Raton, Fla.

[22] Filed: Aug. 9, 1972

[21] Appl. No.: 297,213

Related U.S. Application Data

[63] Continuation-in-part of Ser. No. 727,842, May 9, 1968, Pat. No. 3,731,814.

[52] U.S. Cl. ................ 210/82, 210/108, 210/415
[51] Int. Cl. ............................................. B01d 29/38
[58] Field of Search ............ 210/94, 108, 110, 114, 210/413–416, 82

[56] References Cited
UNITED STATES PATENTS

| | | | |
|---|---|---|---|
| 1,195,391 | 8/1916 | Newman | 210/110 |
| 1,513,882 | 11/1924 | Bateman | 210/94 X |
| 1,990,992 | 2/1935 | Lang et al. | 210/415 X |
| 2,451,073 | 10/1948 | Cowherd | 210/108 |
| 3,174,622 | 3/1965 | Lamort | 210/415 X |
| 3,446,665 | 5/1969 | Castiello et al. | 210/415 X |
| 3,502,213 | 3/1970 | Kuribayashi | 210/108 |
| 3,542,197 | 11/1970 | Rosaen | 210/108 |
| 3,574,509 | 4/1971 | Zentis | 210/108 |

Primary Examiner—John Adee

[57] ABSTRACT

A filter for removing solid particles from a fluid in which an inlet supplies the fluid to be filtered to one side of the screen, and an outlet carries away the filtered fluid from the other side of the screen, wherein means are coupled to the outlet responsive to an absolute drop in normal pressure therein below a predetermined amount for introducing a higher pressure back wash into the outlet, and means are coupled to the inlet responsive to an increase in normal pressure in the inlet for terminating the flow of back wash into the outlet.

11 Claims, 2 Drawing Figures

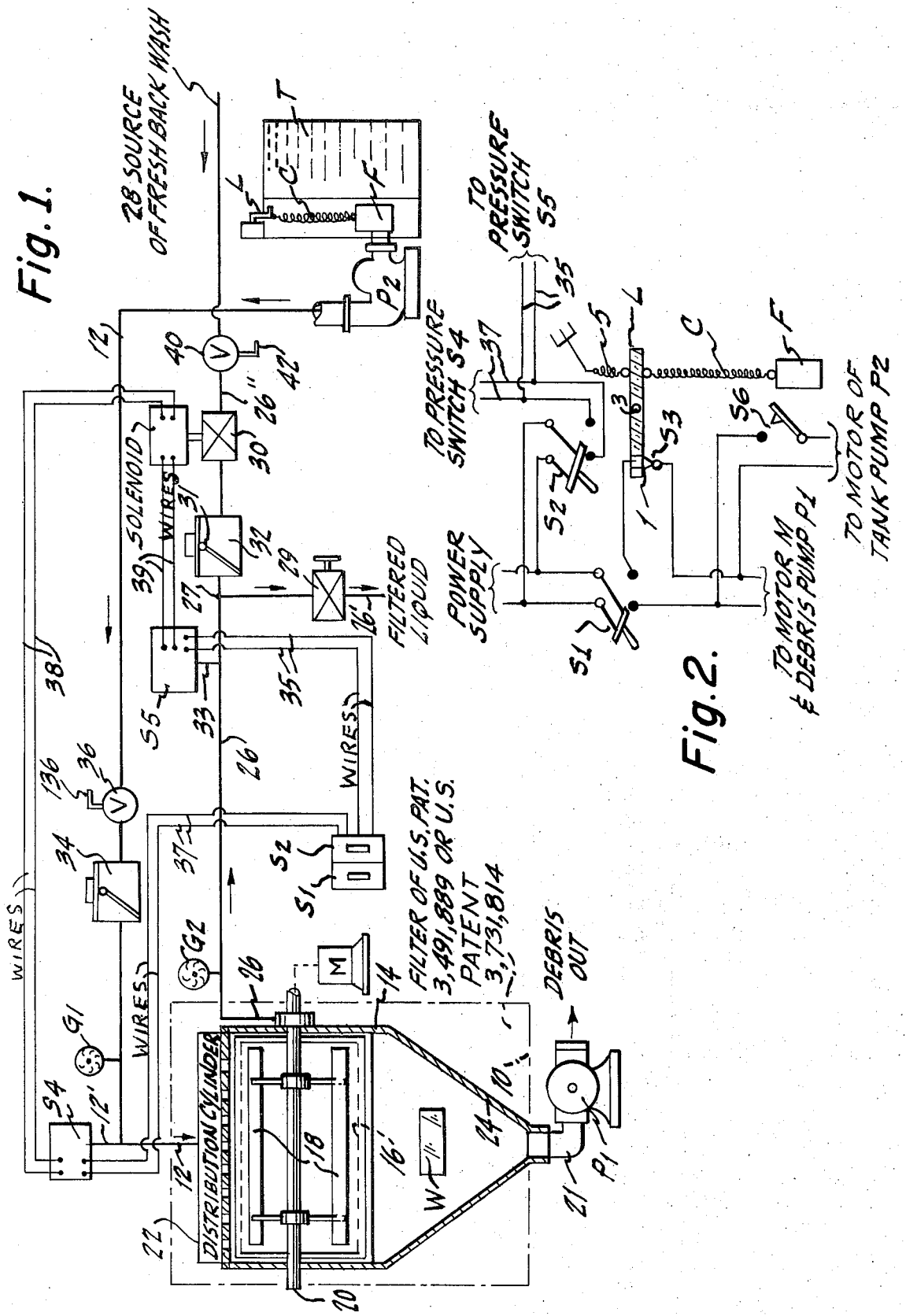

LIQUID FILTER SYSTEM HAVING AUTOMATIC FILTER BACK WASH CONTROL AND METHOD OF OPERATION

This invention relates to liquid filters having an automatic back wash control and is a continuation-in-part of my copending patent application Ser. No. 727,842 filed May 9, 1968 for "Liquid Filter" now U.S. Pat. No. 3,731,814.

Though not limited thereto, the invention is particularly applicable to my filter which comprises an outer housing or casing and an inner chamber containing thereon a cylindrical filter screen in whose interior there are provided rotatable washer arms for continually and pulsatingly producing by means of said arms a back wash of liquid from the interior of the inner chamber out through the filter screen for dislodging solid particles tending to cling to the exterior of the filter screen. A liquid distribution arrangement may be located between the inlet and the filter screen for substantially uniformly distributing the incoming liquid over the length of the screen as disclosed in my patents. My U.S. Pat. No. 3,491,889 upon which the invention in my aforesaid copending application is based clearly describes and illustrates the filter to which the automatic back wash control system of the present invention is applicable.

In my aforesaid liquid filters the efficiency thereof may decrease when there is matting on the exterior of the screen due for example to a sudden heavy concentration of solid particles in the incoming liquid, or for other reasons. In such a case, the debris, whether pulp fibres or other solid material contained in the incoming liquid to be filtered, may build up and produce a mat on the exterior surface of the screen with a consequent decrease in outlet pressure of the filtered liquid. To dislodge this matting and clear the exterior of the filter screen and restore the efficiency of the filter, I have provided a novel, relatively simple back wash control system which makes use of commercially available component parts connected together and so arranged uniquely to accomplish this purpose.

One object of the present invention is to provide a novel and effective automatic back wash control for a filter composed of a hollow screen, such as a cylindrically arranged one, upon the exterior of which impinges the liquid to be filtered, and in the interior of which are continuously rotating back washer arms, without interrupting the rotational movement of the back washer arms, and wherein the automatic back wash control operates in response to a predetermined drop in pressure in the filtered liquid output.

Other objects and features will appear in the following detailed description in conjunction with a drawing, wherein:

FIG. 1 illustrates an embodiment of the invention, and

FIG. 2 illustrates schematically an electrical circuit diagram which can be used for the operation of the filter system of FIG. 1.

The filter per se to which the present invention is especially applicable is diagramatically shown within the dot-dash box 10 and comprises an inlet conduit 12 supplying the liquid or water to be filtered, a stationary metal housing or casing 14 containing therein an inner stationary metal foraminous chamber or cylinder provided with a filter screen or cloth 16. Within the inner cylindrical chamber of cylinder there are provided a plurality of back washer arms 18 symmetrically positioned around and affixed to a revolvable shaft 20. The drive shaft 20 is mechanically driven by a rotor-motor M by means of a pulley, not shown. The arms 18 are so designed, oriented and arranged that as they rotate with rotary movement of the shaft the arms scoop up and forcibly push the liquid from the interior of the inner chamber outwardly and through the filter screen at the locations adjacent the arms nearest to the screen, thereby dislodging solid particles tending to cling to the exterior of the filter screen. The incoming water in inlet 12 which is to be filtered is fed to a liquid distribution arrangement 22 and then impinges upon the exterior surface of the screen. The filtered liquid is drawn out from outlet conduit or pipe 26 leading into the interior of the inner chamber over a non-filtration path, that is, over a path devoid of screening, as disclosed in my aforesaid patents. The bottom of the housing 14 communicates over its entire length with a funnel 24 to enable the debris, such as pulp fibres, sediment or other solid particles filtered from the incoming liquid to be suctioned or washed out through pipe 21.

The filter described above is disclosed in my U.S. Pat. No. 3,491,889. The filter is also disclosed in my U.S. Pat. 3,731,814, in which the inner chamber is in the form of a drum. The cylindrical surface and the flat surfaces of the drum contain filtration screens. There are scooper-type washer arms positioned close to but spaced from the flat screens, in the interior of the drum, and also washer arms positioned close to but spaced from the cylindrical screen, also in the interior of the drum. The drive shaft causes all of the washer in the interior of the inner chamber adjacent to the cylindrical and flat screens to rotate simultaneously. The automatic back wash control of the present invention is also useful with this type of filter.

The discharge funnel 24 is provided with a transparent window W to enable the operator to observe the amount of debris falling into the tunnel. A debris pump P1 works continuously during the operation of the filter to pump debris out from the funnel 24. The debris pump is commercially available and may be a 1 inch "Jabsco" metering pump with variable speed drive and a neoprene impeller to eliminate the chances of a large gob of debris dropping into the suction of the pump and thereby plugging up the pump and causing a build-up of debris on the filter cloth mesh screen 16. The normal discharge of such a pump can be approximately 2 gallons per minute or such as to suit conditions of operation. The liquid or water in the output of the debris pump P1 can be salvaged and used over again in the input supply system and the debris also salvaged (particularly, valuable pulp fibres) by using an inclined screen in the manner shown in FIG. 9 of my aforesaid U.S. Pat. No. 3,731,814 and described therein. The speed of the debris pump is manually controllable by the operator who should be monitoring the amount of debris in the discharge funnel 24 through the window W.

In the operation of the filter, the pressure in inlet conduit 12 is only a few pounds per square inch above the pressure in filtered liquid outlet conduit 26. As an example only, and not by way of limitation, the inlet pressure in conduit 12 may be 30 p.s.i. while the outlet pressure in conduit 26 may be 27 to 28 p.s.i. during the normal operation of the filter with no matting on the screen. A manually adjustable gate valve 29 in the filtered liquid outlet conduit 26 enables adjustment of the differential pressure between inlet and filtered liquid outlet. A pressure gauge G1 in the inlet supply indicates the input pressure. A pressure gauge G2 in the filtered liquid outlet indicates the filtered liquid outlet pressure. An extension conduit or pipe 26' for conducting away the filtered liquid is coupled to conduit 26 through a valve 29. At point 27 there is provided a T well known in the plumber trade. One side of the T at point 27 is connected through an extension or backwash conduit or pipe 26" to a source 28 of fresh back wash liquid supply, such as water free of debris, providing for example, 50 p.s.i. pressure. In this way, the filtered liquid outlet pipe 26 communicates with pipe or conduit 26' and with pipe or conduit 26".

A double-acting electrically operated solenoid valve 30 and a horizontal swing check valve 32 are inserted in the conduit line 26" as shown. The horizontal swing check valve 32 has an inclined flapper hinged at point 31. Such a check valve and such a double-acting electrically operated solenoid valve are well known in the art and are commercially available. Electrically operated solenoid valve 30 has two solenoids or operating coils. This valve 30 is operated by electrical current either to open or close conduit 26" to the flow of the high pressure back wash supply depending upon which solenoid or coil is energized.

In the inlet conduit 12 there is provided a horizontal swing check valve 34 and a hand-operated ball type shut-off valve 36 (which may be a gate valve, if desired). Check valve 34 prevents the higher back wash pressure from source 28 from entering the 30 p.s.i. pressure inlet supply in conduit 12 during back wash. The higher backwash pressure at switch S4 for actuating the same will be somewhat lower than the 50 p.s.i. from source 28 due to pressure drops across valve 29 and the cylindrical screen 16; therefore switch S4 is set to operate at this lower pressure which is still appreciably higher than the 30 p.s.i. inlet pressure in inlet conduit 12. Valve 36 enables the operator to shut off by hand the input supply of the liquid to be filtered through handle 136. To assure a constant supply of inlet liquid to be filtered and adapted to flow through inlet 12 there is provided a tank T containing the liquid to be filtered and a pump P2 to assure a constant input pressure in inlet 12. As a refinement, if desired, the tank T may be provided with a metal float F which controls a lever-operated switch S3 which, in turn, can cut off the operating electrical current to the drive motor M for the filter, to the motor for the debris pump P1 and to the motor for the tank pump P2 when the liquid in tank T falls below a predetermined level. To achieve this, the electrical connections from the electrical power supply mains for operating motor M and pump P2 may go through a pair of contacts in switch S3 controlled by the lever L as shown in FIG. 2. There are numerous well known ways of controlling pumps in response to the change in level of the tank liquid, and the type will depend on the kind of liquid used in the tank. Hence, no claim is made to the float or tank or pump per se. As an alternative, not shown, the float F can be used to maintain the minimum level in the input tank T when there is a reduced input to the tank by controlling through the lever switch a double-acting solenoid valve to open a pipe or conduit permitting fresh liquid to enter the tank T and maintain a predetermined level. After the predetermined level is obtained, the last solenoid valve is energized to close the pipe leading fresh liquid to the tank.

An electric high pressure responsive switch S4 is connected by a conduit 12' to the inlet supply 12. An electric low pressure responsive switch S5 is connected by a conduit 33 to the filtered liquid outlet conduit 26. Both pressure switches are adjustable in their pressure settings. These pressure switches S4 and S5 are commercially available each having a high pressure side and a low pressure side. Both pressure switches are the same type. Switch S4 is wired up to the high pressure contact side while switch S5 is wired up to the low pressure contact side. The high pressure switch S4 when energized passes electrical current to that coil of double-acting solenoid valve 30 via wires 38 which will close valve 30 to the passage of high pressure back wash liquid therethrough from source 28. The low pressure switch S5 when energized passes electrical current via wires 39 to that coil of double-acting solenoid valve 30 which will open valve 30 to the passage of the high pressure back wash liquid therethrough from source 28. The high pressure switch S4 is electrically connected by wires 37 to hand-operated switch S2 and electrically connected by wires 38 to a coil of solenoid valve 30. The low pressure switch S5 is electrically connected by wires 35 to hand-operated switch S2 and electrically connected by wires 39 to another coil or winding of solenoid valve 30. High pressure switch S4 is set to operate at a pressure somewhat below the 50 p.s.i. backwash pressure but appreciably above the 30 p.s.i. normal inlet pressure and thus when actuated to control the solenoid to close the valve 30 to terminate the flow therethrough of fresh back wash from source 28. Low pressure switch S5 is set to operate at an absolute pressure in the filtered outlet conduit 26 which is 2–4 p.s.i. and thus when actuated to control the solenoid to open valve 30 to enable the passage therethrough of fresh back wash from source 28. This absolute pressure is independent of the pressure of the fluid in the inlet (adjustable, if desired) below the desired outlet pressure. Thus, if the inlet pressure is 30 p.s.i. and the normal desired filtered liquid outlet pressure is 27 p.s.i., the low pressure switch S5 can be set to operate at 24–25 p.s.i. The drop in pressure in the filtered liquid outlet conduit is indicative of a build up or matting of solid particles on the exterior surface of the cloth mesh filtration screen. Double acting solenoid valve 30 is thus controlled by the two pressure switches S4 and S5.

A hand-operated switch S1 is the main starting switch and is provided for starting the motor M and the debris metering pump P1 at the same time. Hand-operated switch S2 serves to supply electrical current to the two pressure-operated switches S4 and S5. Both of these two hand-operated switches S1 and S2 may be double blade switches as shown in FIG. 2. Switches S1 and S2 are preferably mounted on the debris discharge funnel 24 for ease of access.

A shut-off ball valve 40, hand-operated by handle 42 is inserted into the high pressure 50 p.s.i. back wash conduit 26" and is used in its closed position to prevent any back wash water or liquid from entering the filter system when the filter is shut down inasmuch as the double-acting electrically operated solenoid valve is controlled in its operation by the pressure switches. Shut-off valve 40 may be a ball type or a gate valve.

This shut off valve as well as shut off valve 36 should be opened after the filter is put back in operation.

The tank T which contains the liquid to be filtered is provided with a float F in turn mechanically connected to the lever L of a lever-operated switch S3 by a small chain C. The float F and chain C may be contained within four pipes or rods arranged parallel and spaced from one another in a circle to act as guides for the float as it rises and falls within the tank when the liquid level in the tank changes. FIG. 2 illustates diagramatically how the lever L of insulation material is connected to the chain C and also to the movable metal contact 1 of the switch S3. Lever L is pivoted at point 3 and is urged by spring 5 to cause the contacts of switch S3 to engage each other. When the level of the liquid in tank T falls below a predetermined level the weight of the float F via chain C overcomes the force exerted by spring 5 and lowers the free end of lever L and raises contact 1 of switch S3 which is affixed to the lever, thereby causing the contacts to disengage and break the electrical circuit therethrough.

A description of the operation of the filter and automatic back wash system will now be given: Let it be assumed that the inlet pressure in conduit 12 when the incoming water to be filtered is flowing therethrough is 30 p.s.i., the filtered water outlet pressure in conduit 26 is 27 p.s.i., and the pressure of the back wash water from source 28 is 50 p.s.i. First, the main starting switch S1 is actuated to start up the motor M and the debris pump P1. Second, thereafter switch S2 is closed to supply electrical current for pressure switches S4 and S5. The setting of low pressure switch S5 may be 2-4 p.s.i. below the normal pressure of 27 p.s.i. of the filtered liquid outlet 26. Variations of all of these pressures relatively to suit different conditions can be made, depending on such factors, for example, as the type of liquid to be filtered, etc. Then the 30 p.s.i. water to be filtered is to be turned on by opening ball or gate valve 36 and operating tank pump switch S6. Next the differential gate valve 29 should now be adjusted to provide a 3 p.s.i. pressure in the outlet 26 below the inlet pressure in conduit 12. Finally, the ball shut-off valve 40 on the 50 p.s.i. fresh back wash water supply should be opened. The filter should now be in operation.

With a proper setting of low pressure switch S5, a decrease in disolute output pressure in conduit 26 to 5–7 p.s.i. below inlet pressure resulting from matting or build up of debris on the filter screen will cause the switch S5 to respond and, in turn, cause the double-acting solenoid valve 30 to be energized to open the filter to the onrush of the 50 p.s.i. clean fresh back wash liquid supply 28 through the outlet conduit 26. When the high pressure back wash flowing through the outlet conduit 26 and the interior of the inner chamber of the filter and through the filtration screen knocks off the debris or mat from the exterior of the filter screen, the high pressure back wash liquid will raise the pressure in the inlet conduit 12 between the filter and the check valve 34, thereby operating the pressure switch S4 which is responsive to the higher pressure caused by the back wash liquid. The operation of switch S4 in response to the higher pressure back wash will cause the double-acting solenoid valve to shut off the high pressure back wash and prevent such back wash from entering the clean filtered liquid outlet 26 and 26'.

The electrical circuit diagram of FIG. 2 shows one form of circuitry that may be used in the practice of the invention. The operative circuit for the motor M, the debris pump P1 and the tank pump P2 passes through the contacts of the lever-operated switch on the tank T. So long as the float F is above a predetermined level the contacts of this switch will engage due to the action of the spring 5. When the level of the liquid in the tank falls below the predetermined level, the weight of the float F will overcome the upward force of the spring 5 and will pull the lever L down. As the lever pivots at point 3 the contacts of the switch S3 will disengage and the operating circuit for the motor M and the two pumps will be broken. The switch S6 enable the tank pump P2 to be started up after switches S1 and S2 are closed. Obviously, the electrical circuits other than that shown in FIG. 2 can be used and are well known in the art, with additional contacts on the lever L and/or relay controls.

To shut down the filter, the 30 p.s.i. inlet water to be filtered is shut off. Then the filter should be run for 3–4 minutes so that the back wash water can clean out the debris from the filter. The cleanliness of the filter can be gauged by observing the debris discharge. When the filter is clean, the hand-operated ball valve 40 should be closed to shut off the high pressure back wash flow. Then the main starting switch S1 should be opened. If the filter is to be left unused for any length of time, it may be advisable to open switch S2 and thereby disconnect the electric current from the pressure switches.

An advantage of the present invention is that all component parts of the back wash supply system are well known in the art and are commercially available for the purposes herein described. Suitable pressure switches may be those made by the Square D Company and used in home water systems. The variable speed electric motor for the debris pump need only be one-third to one-half horsepower, the double-acting solenoid should be one operating preferably on 110 volts, 60 cycles, and the two horizontal check valves may have a rating of 125 p.s.i.

I have disclosed an automatic method and means for cleaning the filter by a high pressure back wash operation while the filter is in operation and without shutting down the motor M which drives the washer arms and without shutting down the inlet supply to the filter.

I claim:

1. The combination with a liquid filter for removing solid particles from a liquid, comprising a stationary housing containing therein an inner chamber having a filter screen mounted thereon, a shaft in the interior of and along an axis of said inner chamber, backwasher arms fixedly mounted on said shaft, means for producing relative motion between said arms and screen, an inlet for introducing the liquid to be filtered through an opening in said housing and onto the exterior surface of said screen, a filtered liquid outlet communicating with the interior of said screen over a path devoid of screening for carrying away the liquid which has been filtered by said screen, of pressure responsive means coupled to said filtered liquid outlet and responsive to an absolute drop in pressure in said filtered liquid outlet below a predetermined pressure, said pressure responsive means connected to and controlling a valve for introducing into said filtered liquid outlet backwash liquid free of debris at an appreciably higher pressure than the normal pressures in either said inlet or said filtered liquid outlet, a second pressure responsive means coupled to said inlet and responsive to a pressure appreciably higher than the normal pressure in said inlet, said second pressure responsive means controlling said valve for terminating the flow of said backwash liquid into said filtered liquid outlet.

2. The combination of claim 1 wherein said first pressure-responsive means is a first pressure switch, said valve is a double-acting electrically controlled valve, said second pressure responsive means is a second pressure switch, and including electrical connections from said switches to said double-acting electrically controlled valve.

3. The combination of claim 2 wherein said double-acting electrically controlled valve includes a solenoid having double coils, said first pressure switch being connected to one coil and said second pressure switch being connected to the other coil.

4. The combination of claim 3, including a horizontal check valve positioned between said valve and said filtered liquid outlet, a gate valve in said inlet, and another horizontal check valve positioned in said inlet between said gate valve and said filter.

5. The combination of claim 3, including means for maintaining constant input pressure in said inlet, a gate valve in said outlet to adjust the pressure differential between inlet and outlet, a horizontal check valve positioned between said solenoid valve and said filtered liquid outlet, a gate valve in said inlet, and another horizontal check valve positioned in said inlet between said last gate valve and said filter.

6. The combination of claim 5, wherein there is provided a shut-off valve for said source of back wash liquid.

7. The combination of claim 1, wherein said filter includes a liquid distribution arrangement between said inlet and the exterior surface of said screen for distributing the incoming liquid from said inlet substantially uniformly over the length of said screen, and including means for maintaining a normal substantially constant input pressure in said inlet.

8. In a backwash filter comprising a housing containing a hollow screen, inlet means for distributing the incoming liquid substantially uniformly onto the exterior surface of and over the length of said screen, an outlet communicating with the interior of said screen over a path devoid of screening, the method of operation which includes introducing in said outlet in response to an absolute drop in pressure in said outlet below a predetermined pressure a backwash liquid at a pressure appreciably higher than the normal operating pressures in either said inlet or outlet, whereby the backwash liquid enters the interior of said screen to thereby exert an outwardly directed force for dislodging particles tending to clog the exterior surface of the screen, and terminating the flow of backwash liquid in response to an increase in pressure in said inlet appreciably higher than the normal pressure in said inlet whereby said termination permits inlet pressure to return to normal operating pressure and filtration resumes.

9. The combination with a liquid filter for removing solid particles from a liquid, comprising a housing containing therein an inner chamber spaced therefrom, said inner chamber having a filter screen mounted thereon, an inlet for introducing the liquid to be filtered through an opening in said housing and onto the exterior surface of said screen, a filtered liquid outlet communicating directly with the interior of said screen for carrying away the filtered liquid over a path substantially unimpeded to the flow of liquid therethrough, of means coupled to said outlet responsive to an absolute drop in pressure in said outlet below a predetermined pressure connected to means for introducing into said outlet backwash liquid free of debris at a pressure appreciably higher than the normal pressures in either said inlet or said outlet, and means coupled to said inlet and responsive to an appreciable increase in pressure above the normal inlet pressure caused by the introduction of said backwash liquid connected to means for terminating the flow of said backwash liquid into said outlet.

10. The combination with a liquid filter for removing solid particles from a liquid, comprising a stationary housing containing therein an inner chamber spaced therefrom, said inner chamber having a filter screen mounted thereon, a shaft in the interior of and along an axis of said inner chamber, backwasher arms fixedly mounted on said shaft, means for producing relative motion between said arms and screen, an inlet for introducing the liquid to be filtered through an opening in said housing and onto the exterior surface of said screen, a filtered liquid outlet communicating with the interior of said screen for carrying away the filtered liquid, of means responsive to a drop in pressure in said filtered liquid outlet below a predetermined pressure controlling means for introducing into said filtered liquid outlet backwash liquid free of debris at a pressure appreciably higher than the pressures in either said inlet or said filtered liquid outlet, said last means including a conduit extending from said filtered liquid outlet to a source of said backwash liquid, and also including a double-acting electrically controlled valve in said conduit, a first pressure switch communicating with and responsive to a pressure in said inlet greater than the normal inlet pressure due to the pressure of said backwash liquid, a second pressure switch communicating with and responsive to a drop in pressure in said filtered liquid outlet, and electrical connections from said switches to said double-acting controlled valve, said double-acting electrically controlled valve comprising a solenoid having double coils, said first pressure switch being connected to one coil and said second pressure switch being connected to the other coil, said first pressure switch being responsive to said increased pressure in said inlet for operating said solenoid valve to close said conduit, said second switch being responsive to a lowering in pressure in said filtered liquid outlet below a predetermined amount for operating said solenoid to open said conduit and permit the inflow of said backwash liquid into said filtered liquid outlet.

11. The combination with a liquid filter for removing solid particles from a liquid, comprising a housing containing therein an inner chamber spaced therefrom, said inner chamber having a filter screen mounted thereon, an inlet for introducing the liquid to be filtered through an opening in said housing and onto the exterior surface of said screen, a filtered liquid outlet communicating with the interior of said screen for carrying away the filtered liquid, of a valve for introducing into said outlet a source of backwash liquid free of debris at a pressure appreciably higher than the normal pressures in either said inlet or said outlet, a low pressure switch coupled to said outlet and responsive to a drop in pressure in said outlet below a predetermined pressure for opening said valve, a connection between said low pressure switch and said valve, and a high pressure switch coupled to said inlet responsive to an increase in pressure in said inlet above the normal pressure therein caused by the flow of said backwash liquid for closing said valve to terminate the flow of backwash liquid into said outlet.

* * * * *

UNITED STATES PATENT OFFICE
CERTIFICATE OF CORRECTION

Patent No. 3,826,368             Dated  July 30, 1974

Inventor(s)  Theodore M. Walters

It is certified that error appears in the above-identified patent and that said Letters Patent are hereby corrected as shown below:

Column 4, line 37, after "2-4 p.s.i." insert -- (adjustable, if desired) below the desired outlet pressure --.

Column 5, line 48, "disolute" should read -- absolute --.

Signed and sealed this 8th day of October 1974.

(SEAL)
Attest:

McCOY M. GIBSON JR.
Attesting Officer

C. MARSHALL DANN
Commissioner of Patents